United States Patent [19]

Sumpter et al.

[11] Patent Number: 5,206,329
[45] Date of Patent: Apr. 27, 1993

[54] ONE PART HEAT CURABLE ORGANOPOLYSILOXANE COMPOSITIONS

[75] Inventors: Chris A. Sumpter; Larry N. Lewis, both of Scotia, N.Y.; Samuel J. Danishefsky, New Haven, Conn.

[73] Assignee: General Electric Company, Schenectady, N.Y.

[21] Appl. No.: 800,310

[22] Filed: Nov. 29, 1991

[51] Int. Cl.$^5$ ............................................. C08G 77/06
[52] U.S. Cl. ........................................ 528/15; 528/21
[58] Field of Search ................................. 528/15, 21

[56] References Cited

U.S. PATENT DOCUMENTS 5,104,919  4/1992  Okami et al. .......................... 528/15
5,122,585  6/1992  Sumpter et al. ....................... 528/15

Primary Examiner—Melvyn I. Marquis
Attorney, Agent, or Firm—William A. Teoli; William H. Pittman

[57] ABSTRACT

Heat curable organopolysiloxane compositions are provided which utilize a vinyl containing polydiorganosiloxane, silicon hydride siloxane, a platinum group metal catalyst, and a triazoline dione as an inhibitor for the platinum group metal catalyst. The heat curable organopolysiloxane compositions of the present invention exhibit improved shelf stability, cure time and resistance to change in final properties when subjected to heat aging.

8 Claims, No Drawings

ONE PART HEAT CURABLE ORGANOPOLYSILOXANE COMPOSITIONS

CROSS REFERENCE TO RELATED APPLICATION

Reference is made to copending U.S. patent application Ser. No. 07/800,311, filed Nov. 29, 1991, and U.S. patent Ser. No. 07/624,950 filed Dec. 10, 1990.

BACKGROUND OF THE INVENTION

The present invention relates to one part heat curable organopolysiloxane compositions having improved shelf stability. More particularly, the present invention relates to the employment of 4-substituted-1,2,4-triazoline-3,5-diones as inhibitors in a platinum group metal catalyzed one part heat curable organopolysiloxane composition.

Prior to the present invention, as shown by Eckberg, U.S. Pat. No. 4,670,531 and Cavezzan et al, U.S. Pat. No. 4,640,939, azodicarboxylates, such as dialkylazodicarboxylates, were used to inhibit reaction between an organopolysiloxane base polymer having olefinically unsaturated organic radicals and an organohydrogenpolysiloxane which was catalyzed by an effective amount of a precious metal containing catalyst such as platinum. Although valuable results can be achieved by the use of such dialkylazodicarboxylate inhibitors, experience has shown that the shelf life of the resulting heat curable organopolysiloxane compositions is often insufficient to satisfy the requirements for many heat curable organopolysiloxane composition applications. Accordingly, additional inhibitors are constantly being sought by the silicone industry to extend the shelf life of one part heat curable organopolysiloxane compositions.

SUMMARY OF THE INVENTION

The present invention is based on the discovery that triazoline diones included within the formula,

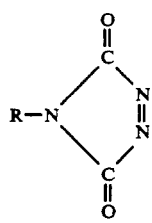

(1)

where R is selected from the class consisting of $C_{(1-3)}$ monovalent hydrocarbon radicals and $C_{(1-13)}$ monovalent hydrocarbon radicals substituted with radicals inert during platinum group metal catalyzed hydrosilylation reactions, have been found to be particularly effective as cure inhibitors when utilized at an effective amount in one part heat curable platinum group metal catalyzed organopolysiloxane compositions. Unexpectedly, substantially enhanced shelf stability at ambient temperatures also has been found when the compounds of formula 1 are used as inhibitors in place of the dialkylazodicarboxylates in precious metal catalyzed organopolysiloxane compositions, such as shown by Eckberg in U.S. Pat. No. 4,670,531.

STATEMENT OF THE INVENTION

There is provided by the present invention a one part heat curable organopolysiloxane composition comprising, (A) vinyl substituted organopolysiloxane fluid
(B) siloxane hydride
(C) an amount of a platinum group metal catalyst which is sufficient to effect addition between (A) and (B), and
(D) an amount of a triazoline dione of formula (1) which is effective as a hydrosilylation inhibitor.

There is further provided by the present invention, a one part heat curable organopolysiloxane composition comprising by weight, (E) 100 parts of a vinyl substituted organopolysiloxane fluid,
(F) 1 to 20 parts of a siloxane hydride,
(G) an amount of a platinum group metal catalyst, which is sufficient to effect addition between (E) and (F), and
(H) an amount of a triazoline dione of formula (1) which is effective as a hydrosilylation inhibitor.

Some of the triazoline dione compounds included within formula (1) which can be employed as inhibitors in the practice of the invention are 4-phenyl-1,2,4-triazoline-3,5-dione. 4-methyl-1,2,4-triazoline-3,5-dione, 4-(2,6-diisopropylphenyl)-1,2,4-triazoline-3,5-dione, 4-(2,4,6-trimethylphenyl)-1,2,4-triazoline-3,5-dione, 4-ethyl-1,2,4-triazoline-3,5-dione, and 4-trichloromethyl-1,2,4-triazoline-3,5-dione.

Radicals included within R of formula (1) are for example, $C_{(1-8)}$ alkyl, such as methyl, ethyl, propyl, butyl, and aryl radicals such as phenyl, tolyl and xylyl. In addition, substituted radicals such as chlorophenyl, nitrophenyl, and trifluoropropyl, are also included.

An effective amount of triazoline dione of formula (1), has been found to be 0.001 to 0.50% by weight, based on the weight of the one part heat curable organopolysiloxane composition, and preferably from 0.025% to 0.15% by weight.

The vinyl organopolysiloxane fluid, or "vinylsiloxane" utilized in the one part heat curable organopolysiloxane compositions of the present invention can have a viscosity of from about 100 to 200,000 centipoises and from about 0.05 to about 3.5 mole %, and preferably from 0.14 to about 2 mole % of vinylsiloxy units based on the total moles of condensed organosiloxy units in the vinylsiloxane. The preferred vinyl siloxanes are included within the following formula:

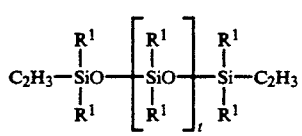

(2)

where $C_2H_3$ is vinyl, and $R^1$ is selected from $C_{(1-13)}$ monovalent hydrocarbon radicals free of olefinic unsaturation, and t is a positive integer having a value sufficient to provide a vinyl siloxane viscosity of from about 100 to 200,000 centipoises at 25° C. Preferably, $R^1$ is selected from alkyl radicals of 1 to 8 carbon atoms, such as methyl, ethyl, propyl; mononuclear aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula,

The vinylsiloxane of Formula (2) can be prepared by equilibrating the appropriate cyclotetrasiloxane with appropriate vinyl terminated low molecular weight polysiloxane chain-stoppers. However, if vinyl organosiloxy units are desired in the backbone, a predetermined amount of cyclic vinylorganosiloxane can be used in the equilibration mixture. A preferred chain-stopper for such equilibration reaction is a low molecular weight vinyl terminated organopolysiloxane such as the corresponding disiloxane, trisiloxane, tetrasiloxane. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. The chain-stopper can be equilibrated with octamethylcyclotetrasiloxane in the presence of a catalyst to produce the desired vinyl siloxane having a viscosity varying from 100 to 200,000 centipoises at 25° C. The catalyst that is utilized is preferably a mild acid catalyst, such as toluenesulfonic acid or an acid treated clay such as Filtrol, which is a sulfuric acid activated clay manufactured and sold by Engelhard Corp. of Edison, N.J. When the equilibration has proceeded to about 85% completion, the acid catalyst can be neutralized with a base or simply filtered if acid activated clay is used to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

The siloxane hydride or siloxane hydride fluid can have from 0.04% to 1.4% by weight of chemically combined hydrogen attached to silicon. One form of the siloxane hydride is a "coupler", having the formula,

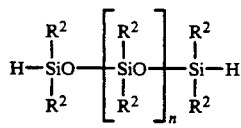

where $R^2$ is selected from $C_{(1-3)}$ monovalent hydrocarbon radicals free of olefinic unsaturation and n is an integer having a value sufficient to provide the "coupler" with a viscosity of 1 to 500 centipoises at 25° C. and from about 3 to 9 mole percent of chain-stopping diorganohydride siloxy units, based on the total moles of chemically combined siloxy units in the silicon hydride siloxane fluid.

In addition to the silicone hydride coupler of formula (3), the silicon hydride siloxane used in the heat curable organopolysiloxane compositions of the present invention also can include silicon hydride resins consisting essentially of the following chemically combined units,

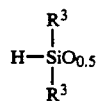

chemically combined with $SiO_2$ units, where the $R^3+H$ to Si ratio varies from 1.0 to 2.7. Silicon hydride resin also can have units of the formula,

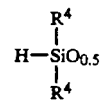

chemically combined with $SiO_2$ units and $(R^5)_2SiO$ units, where the $R^4+R^5+H$ to Si ratio varies from 1.2 to 2.7, where $R^3$, $R^4$ and $R^5$ are $C_{(1-13)}$ monovalent hydrocarbon radicals free of olefinic unsaturation selected from $R^2$ radicals.

The silicon hydride siloxane can be made by hydrolyzing the corresponding hydride chlorosilanes in the presence of an organic hydrocarbon solvent. For resins having only monofunctional units and tetrafunctional units, a hydrogen diorganochlorosilane can be hydrolyzed with a tetrachlorosilane. Resins having monofunctional siloxy units, difunctional siloxy units, and tetrafunctional siloxy units, can be obtained by hydrolyzing a hydrogen diorgano dichlorosilane, a tetrachlorosilane and a diorganodichlorosilane at particular ratios. Additional silicon hydride resin are shown by Jeram, U.S. Pat. No. 4,040,101 which is hereby incorporated by reference.

The silicon hydride siloxane fluid also can include linear hydrogen containing polysiloxane having the formula,

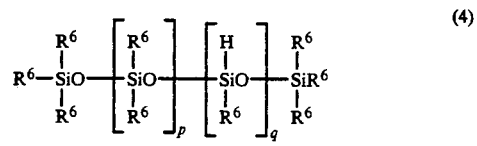

where $R^6$ is a $C_{(1-13)}$ monovalent hydrocarbon radical free of olefinic unsaturation, selected from $R^2$ radicals, and p and q are integers having values sufficient to provide a polymer having a viscosity of from 1 to 1,000 centipoises at 25° C.

The silicon hydride siloxane fluid of formula (4) can be produced by equilibrating the appropriate hydrogen-cyclopolysiloxane with the appropriate cyclopolysiloxane containing $R^6$ substituent groups, in combination with low molecular weight linear triorganosiloxy end-stopped chain-stoppers.

In formulas (3) and (4) and the chemically combined units described above, $R^2$, $R^3$, $R^4$, $R^5$ and $R^6$ can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The silicon hydride coupler of formula (3) can be prepared by a hydrolysis process or an acid catalyzed equilibration process. In the equilibration process the appropriate cyclotetrasiloxanes are equilibrated with a low molecular weight hydrogen terminated chain-stopper, such as a dihydrogen tetraorganodisiloxane. The acid catalyzed equilibration reaction is much the same as disclosed for the production of the vinyl containing base polymer. By the hydrolysis process, the appropriate hydrogen diorganochlorosilanes are hydrolyzed with the appropriate amount of diorganodichlorosilanes to produce the desired polymer of formula (3) above. The resulting siloxane hydride can be separated from undesirable cyclics by stripping.

Platinum group metal catalysts which can be employed in the one part heat curable compositions of the present invention include those based on the metals rhodium, ruthenium, palladium, osmium, iridium and platinum. Especially preferred are the well known platinum and rhodium catalysts, such as the platinum hydrocarbon complexes described in U.S. Pat. No. 3,159,601 and 3,159,662 to Ashby, the platinum alcoholate catalysts described in U.S. Pat. No. 3,220,970 to Lamoreaux, the platinum complexes of U.S. Pat. No. 3,814,730 to Karstedt, the platinum chloride-olefin complexes described in U.S. Pat. No. 3,516,946 to Modic and the rhodium complexes described in U.S. Pat. No. 4,262,107 to Eckberg, all of which are incorporated herein by reference.

An effective amount of the platinum group metal catalyst of the present invention is that amount which is sufficient to provide from 5 ppm to 200 ppm of platinum group metal based on the weight of heat curable organopolysiloxane compound composition, and preferably from 10 ppm to 100 ppm.

There can be incorporated in the heat curable organopolysiloxane compositions of the present invention from 5 to 100 parts by weight of a filler based on 100 parts by weight of the vinyl siloxane. The filler can be selected from fumed silica, precipitated silica and mixtures thereof. Preferably less than 50 parts by weight of filler, per 100 parts by weight of the vinyl siloxane is utilized. In place of the reinforcing filler, such as fumed silica, and precipitated silicas, there may be utilized extending fillers which do not unduly increase the viscosity of the composition in the uncured state, by increasing to some extent the tensile strength of the composition. The reinforcing and extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the heat curable compositions of the present invention, can be achieved at temperatures of from 100° C. to 200° C. and preferably 135° C. to 150° C.

In order that those skilled in the art will be better able to practice the present invention, the following examples are given by way of illustration and not by way of limitation. All parts are by weight.

EXAMPLE 1

A heat curable organopolysiloxane composition was prepared by adding 50 mg ($2.86 \times 10^{-4}$ mol, 0.05 weight %) of 4-phenyl-1,2,4-triazoline-3,5-dione (PTD) in methylene chloride to 96 g of a vinyl end stopped polydimethylsiloxane fluid having a viscosity of 4000 centipoise. There was added to the resulting mixture, 58 μL (25 ppm Pt) of a platinum catalyst shown in Karstedt, U.S. Pat. No. 3,775,452. The resulting mixture was then stripped of methylene chloride to form a homogeneous red mixture. There was added to the mixture, 4.0 g of a silicon hydride siloxane having a viscosity of 150 centipoise and 0.8 weight % hydrogen. The resulting formulation was then mixed for approximately 2 minutes. Based on method of preparation there was obtained a heat curable one part organopolysiloxane composition, referred to hereinafter as "PTD".

The above procedure was repeated, except that in place of the PTD there was used an equivalent molar amount of 4-methyl-1,2,4-triazoline-3,5-dione (MTD). In addition an equivalent number of moles of diallyl maleate (DAM), as shown in U.S. Pat. No. 4,256,870, was used as an inhibitor in the same heat curable organopolysiloxane formulation following the same procedure.

Following the above procedure, an additional one part heat curable organopolysiloxane formulation was prepared using PTD as an inhibitor, except that 25 ppm of Pt was used from Lamoreaux U.S. Pat. No. 3,220,970. This heat curable mixture is referred to hereinafter as PTD'. It was found that the heat curable mixture containing the DAM inhibitor had a gel time of about 70 seconds at 135° C., while the heat curable formulations containing the triazoline dione inhibitors had a gel time between 378–456 seconds at 135° C. A possible explanation for the more rapid gel time for the DAM formulation is the fact that DAM is more volatile than PTD.

A comparison was also made between the DAM inhibitor and the PTD inhibitor with respect to their ability to impart long term heat stability to a one part heat curable organopolysiloxane over a 5 day heating period at 50° C. with respect to change in viscosity. In Table 1, below PTD' means the formulation catalyzed with the Lamoreaux catalyst.

TABLE 1

| Inhibitor | Initial Viscosity | Heat Age Viscosity |
| --- | --- | --- |
| | | (5 days at 50° C.) |
| PTD | 3580 | 4080 |
| PTD' | 3230 | 6120 |
| DAM | 4240 | gelled <1 hr. at 50° C. |

EXAMPLE 2

A heat curable organopolysiloxane mixture was prepared in accordance with the procedure of Example 1 using 98.6 g of a vinyl end stopped polydimethylsiloxane fluid having a 700 centipoise viscosity and 10 mg of PDT in methylene chloride. There was added to the mixture, 35 μL of the platinum catalyst of Example 1. The methylene chloride was then removed in vacuo to form a homogeneous red silicone mixture. There was added to the mixture, 1.4 g of a silicon hydride siloxane having a viscosity of 150 centipoise and 0.24 weight % hydrogen. The resulting heat curable mixture was mixed for approximately 2 minutes.

The above procedure was repeated, except that in place of the PTD inhibitor, there was used the corresponding methyl triazoline dione inhibitor (MTD) and DAM. A series of heat curable organopolysiloxane mixtures were prepared following the same procedure to provide formulations having inhibitor levels in the range of from $1.14 \times 10^{-4}$ moles to $8.56 \times 10^{-5}$ moles.

The above heat curable organopolysiloxane compositions were then tested for hardness after 40 minutes at 150° C. by measuring the distance to which a penetrometer probe of known weight penetrated the cured composition during a specified period of time. A penetration value (in mm) was obtained by employing a combined probe and plunger weight of 19.5 g applied for 10 seconds. Heat stability was determined by a penetration change of less than 1 mm after 3 hours of heat aging at 150° C. The following results were obtained:

TABLE 3

| Inhibitor Level (moles) | Initial Penetration (mm) | Heat aged Penetration (mm) |
| --- | --- | --- |
| $5.71 \times 10^{-5}$ PTD | 2.0 | 2.0 |
| $8.56 \times 10^{-5}$ PTD | 3.9 | 3.9 |
| $1.14 \times 10^{-4}$ PTD | 9.0 | 8.5 |
| $1.14 \times 10^{-4}$ MTD | 3.5 | 3.5 |
| $5.71 \times 10^{-5}$ DAM | 9.2 | 2.0 |
| $8.56 \times 10^{-5}$ DAM | 8.6 | 5.3 |
| $1.14 \times 10^{-4}$ DAM | 8.3 | 5.0 |
| $1.14 \times 10^{-4}$ PTD' | 5.0 | 5.0 |

EXAMPLE 3

Several heat curable organopolysiloxane mixtures were prepared in accordance with the procedure of Example 1, employing as inhibitors PTD, diethylazodicarboxylate (DEAD), as shown by Eckberg, U.S Pat. No. 4,476,166 and azobistoluoyl (ABT) as shown in copending U.S. patent application Ser. No. 07/624,950 filed Dec. 10, 1990. The inhibitors were used in the organopolysiloxane mixtures at the same molar concentration as shown in Example 1. The heat curable mixtures were found to have a cure speed in terms of gel time in seconds at 150° C. of 145 sec. for DEAD 270 for ABT and 440 for PTD. However, the cured mixture employing DEAD as the inhibitor was found to have a large number of bubbles.

The formulations were also evaluated for change in viscosity over a 5 day heat age period at 50° C. It was found that the curable mixture containing DEAD which had an initial viscosity of 3540 gelled in less than 24 hours while the curable mixture containing ABT having an initial viscosity of 3560 gelled in less than 3 days. As shown by Table 1, the viscosity of the curable formulation containing PTD experienced a viscosity increase of about 13% after a 5 day period at 50° C.

EXAMPLE 4

In accordance with the procedure of Example 3, additional heat curable organopolysiloxane mixtures were prepared using PTD, DEAD and ABT as inhibitors at a $5.71 \times 10^{-4}$ molar concentration. The PTD inhibitor formulation experienced a gel time of 1092 seconds at 150° C. while the formulations containing the DEAD inhibitor had a gel time in seconds of 340 and the ABT inhibitor formulations had a gel time of 550 seconds at 150° C. Although the gel times for the DEAD inhibitor and ABT inhibitor were found to be less than the PTD, the former inhibitors resulted in soft cures and a large number of bubbles were found to be present in the cured samples.

The above heat curable mixtures containing the PTD, DEAD and ABT inhibitors were also evaluated for change in heat age viscosity over a 5 day heating period at 50° C. It was found that the PTD experienced a viscosity change of 3470 to 3520 centipoise. The DEAD formulation gelled in less than 24 hours from an initial viscosity of about 3350 centipoise while the ABT inhibitor formulation experienced a viscosity change of from 3600 centipoise to 7250 centipoise after the 5 day heating period at 50° C.

Although the above examples are directed to only a few of the very many variables which can be used in making the heat curable organopolysiloxane compositions of the present invention, it should be understood that the present invention is directed to the use of a much broader variety of trazoline inhibitors, vinyl containing polydiorganosiloxanes and silicon hydride siloxanes as set forth in the description preceeding these examples.

What is claimed is:

1. A one part heat curable organopolysiloxane composition comprising,
   (A) vinyl substituted organopolysiloxane fluid
   (B) siloxane hydride
   (C) an amount of a platinum group metal catalyst which is sufficient to effect addition between (A) and (B), and
   (D) an amount of a triazoline dione which is effective as a hydrosilylation inhibitor.

2. A one part heat curable organopolysiloxane composition comprising by weight,
   (E) 100 parts of a vinyl substituted organopolysiloxane fluid,
   (F) 1 to 20 parts of a siloxane hydride,
   (G) an amount of a platinum group metal catalyst which is effective as a hydrosilylation catalyst, and
   (H) an amount of a triazoline dione which is effective as a hydrosilylation inhibitor.

3. A one part heat curable organopolysiloxane composition in accordance with claim 1, where the vinyl substituted organopolysiloxane fluid is a vinyl substituted polydimethylsiloxane fluid.

4. A one part heat curable organopolysiloxane composition in accordance with claim 1, where the siloxane hydride is a methylsiloxane hydride fluid.

5. A one part heat curable organopolysiloxane composition in accordance with claim 1, where the platinum group metal catalyst is a platinum metal complex.

6. A one part heat curable organopolysiloxane composition in accordance with claim 1, where the triazoline dione inhibitor is a 4-substituted-1,2,4-triazoline-3,5-dione.

7. A one part heat curable organopolysiloxane composition in accordance with claim 5, where the triazoline dione inhibitor is 4-phenyl-1,2,4-triazoline-3,5-dione.

8. A one part heat curable organopolysiloxane composition in accordance with claim 5, where the triazoline dione inhibitor is 4-methyl-1,2,4-triazoline-3,5-dione.

* * * * *